United States Patent [19]
Kang et al.

[11] Patent Number: 6,068,814
[45] Date of Patent: May 30, 2000

[54] COBALT-BASED HEAT-RESISTING COMPOSITION

[75] Inventors: Hwan Sub Kang, Sungnam; Kyeong Ji Park, Suwon, both of Rep. of Korea

[73] Assignee: Keum Kang Co., Ltd., Seoul, Rep. of Korea

[21] Appl. No.: 08/996,182

[22] Filed: Dec. 22, 1997

[30] Foreign Application Priority Data

Dec. 30, 1996 [KR] Rep. of Korea ........................ 96-78443

[51] Int. Cl.$^7$ .................................................. C22C 19/07
[52] U.S. Cl. ............................................ 420/438; 420/436
[58] Field of Search ..................................... 420/436, 439, 420/438

[56] References Cited

U.S. PATENT DOCUMENTS

| | | | |
|---|---|---|---|
| 4,034,588 | 7/1977 | Way et al. ............................... | 420/436 |
| 4,437,913 | 3/1984 | Fukui et al. ............................. | 420/439 |
| 5,066,459 | 11/1991 | Beltran et al. ........................... | 420/436 |
| 5,422,072 | 6/1995 | Mitsuhashi et al. ..................... | 420/436 |
| 5,916,518 | 6/1999 | Chesnes ................................... | 420/438 |

OTHER PUBLICATIONS

Japanese Patent Abstract JP405084592A of Japanese Patent JP 05084592 Apr. 1993.

Derwent Abstract 1986–110010 Mar. 1986.

Metallurgical Dictionary, p. 260, Dec. 1953.

*Primary Examiner*—Scott Kastler
*Attorney, Agent, or Firm*—Fleshner & Kim, LLP

[57] ABSTRACT

This invention relates to a cobalt-based heat-resisting composition used as a spinner wheel material to prepare glass-fiber and more particularly, to a cobalt-based heat-resisting alloy having excellent strength, anti-abrasiveness and anti-oxidative effects at a higher temperature. To establish the chemical composition of an alloy suitable for vacuum melting and casting, Mn and Si are added to the basic alloy composition consisting of Co, Cr, Ni and W, thus controlling a deoxidating effect and fluidity; Nb, Ti, V, Zr, C and Si are used as other additive elements instead of using the conventional high-priced rare earth metals such as (Y) & Ta, Hf and B with the allowed scope of impurities enlarged, thereby preventing any casting defects from the generation of bubbles; since cementite crystal phase of both Nb and Cr is evenly distributed within an alloy and more strong web of the three-dimensional network structure, such crystal phase is strongly supported by austenite structure of Co and Ni having tungsten carbide and Zr as a nucleus.

2 Claims, 3 Drawing Sheets

COBALT-BASED HEAT-RESISTING COMPOSITION

BACKGROUND OF THE INVENTION

1. Field of the Invention

This invention relates to a cobalt-based heat-resisting composition used as a spinner wheel material to prepare glassfiber and more particularly, to a cobalt-based heat-resisting alloy having excellent strength, anti-abrasiveness and antioxidative effects at a higher temperature. To establish the chemical composition of an alloy suitable for vacuum melting and casting, Mn and Si are added to the basic alloy composition consisting of Co, Cr, Ni and W, thus controlling a deoxidating effect and fluidity; Nb, Ti, V, Zr, C and Si are used as other additive elements instead of using the conventional high-priced rare earth metals (such as Y), as well as Ta, Hf and B with the allowed scope of impurities enlarged, thereby preventing any casting defects from the generation of bubbles; since cementite crystal phase of both Nb and Cr is evenly distributed within an alloy and more strong web of the three-dimensional network structure, such crystal phase is strongly supported by austenite structure of Co and Ni having tungsten carbide and Zr as a nucleus.

2. Description of the Prior Art

In general, glassfiber is formed, when melted glass is passed by centrifugal force through walls having multi-porous holes in a high speed-rotation spinner wheel.

Spinner is generally operated at about 1,100° C. at 2,000 rpm. Since glassfiber comes out from small porous walls in a spinner having a higher rotation speed, high fracture strength at high temperature and high corrosion-resistive property against melting glass should be required.

According to the conventional cobalt-based heat-resisting alloy used for a spinner wheel, the following chemical composition by weight % is generally provided: 30% of Cr, 13% of Ni, 10% of W, 2% of Ta and the balance consisting of Co and other elements such as less than 1% of silicon, less than 0.5% of carbon and Zr, B and Y in a small amount depending on the selected elements.

Now that the conventional alloy failed to fully meet the mechanical strength required for a high-speed rotation spinner wheel, however, demand has been increasing for alternative alloy having more high stress fracture and corrosion-resistive properties. In response to this demand, some alloys were proposed in the U.S. Pat. Nos. 4,620,324 and 4,904,290. In these patents, however, the alloys containing some high-priced metals such as Ta, Y and B cannot be easily purchased in the local market, having been in particular characterized in that Hf is not contained in the currently marketed metals as an impurity. In spite of the fact that such alloys have better anti-abrasiveness property and antioxidative effect compared to the conventional alloy, these patents still impose significant limitations on the continuous manufacture of glassfiber for a prolonged period of time under severe conditions.

To comply with these problems, a cobalt-based heat-resisting alloy was developed by this applicant, as proposed in Korean Examined Patent Publication No. 94-8942. This patent relates to an alloy having strength, deoxidative effect and glass corrosion-resistive property at a higher temperature, and is advantageous in that this alloy is suitable for the prolonged use in the glassfiber-forming spinner wheel, while providing in particular a cobalt-based heat-resisting alloy fabricated by the air-melt casting method.

However, this patent has some problems in that since such alloy is formed by the air-melt casting method, the surface of cast is coarse and any casting defects such as fine bubbles in the alloy structure during solidification may occur due to oxygen infiltrated into the liquid metal during the melting process.

Namely, the alloy liquid (liquid phase) at such temperature range, being subjected to infiltration by excessive amount of oxygen and nitrogen in the air, is present as an instable form of oxide or nitride. When the melting material is poured to a cast, it is not crystallized and bubbles generated during reduction weaken the binding power of an alloy and are responsible for lowering the yielding point at a higher temperature.

SUMMARY OF THE INVENTION

To overcome the above mentioned several problems which the conventional cobalt-based heat-resisting alloys have encountered, therefore, an object of this invention is to provide an alloy having excellent strength, anti-abrasiveness and antioxidative effects at a higher temperature. To this end, Mn and Si are added to the basic alloy composition consisting of Co, Cr, Ni and W, thus controlling deoxidating effect and fluidity; Nb, Ti, V, Zr, C and Si are used as other additive elements instead of using the conventional high-priced rare earth metals (such as Y), as well as Ta, Hf and B with the allowed scope of impurities enlarged, thereby preventing any casting defects from the generation of bubbles; strong web of the three-dimensional network structure is firmly supported by austenite structure.

Also, another object of this invention is to provide a novel cobalt-based heat-resisting alloy designed to improve the physical property and to expand the allowance scope of impurities for easy recycling, thereof, by effecting a vacuum-melting casting method to improve the alloy elements as well as the improved methods of melting, casting and heat treatment.

DETAILED DESCRIPTION OF THE INVENTION

Figure 1:
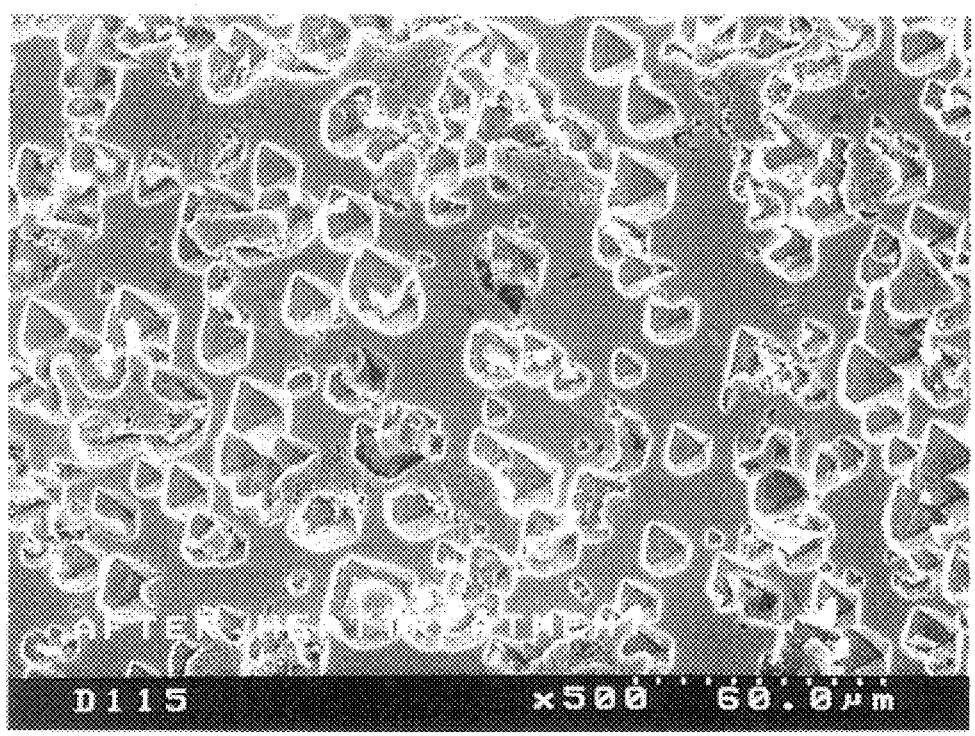
FIG. 1 is an electron microscope photograph showing the solvent treatment of a cobalt-based heat-resisting alloy according to this invention, followed by ageing treatment.

This invention relates to a cobalt-based heat-resisting alloy, a superalloy formed by the vacuum-melt casting method, being characterized in comprising the chemical composition as shown in the following table 1 by wt % with unavoidable impurities but without containing any earth metal.

TABLE 1

| Element | Scope | Element | Scope | Element | Scope | Element | Scope |
|---|---|---|---|---|---|---|---|
| Cr | 25~33% | Nb | 2.5~4.8% | Si | 0.1~0.3% | V | 0.05~0.8% |
| Ni | 9~12% | Zr | 0.1~0.3% | Mn | 0.1~0.3% | Co | Balance |
| W | 6~12% | C | 0.6~1.0% | Ti | 0.1~0.3% | | |

The alloy of this invention is characterized by selectively containing the impurities as shown in the following table 2.

TABLE 2

| Impurity | Scope | Impurity | Scope |
|---|---|---|---|
| S | 0.06% or less | Hf* | *The indicative composition contains less than 2.6% by total weight. |
| Al | 0.07% or less | Ta* | |
| Fe | 0.7% or less | Y* | |
| P | 0.01% or less | | |

This invention is explained in more detail as set forth hereunder.

This invention relates to a cobalt-based stellite superalloy having 11 elements having the following basic chemical composition by wt %: 40~50% of cobalt, 25~30% of chrome, 9~12% of nickel, 6~12% of tungsten, 2.8~4.8% of niobium, 0.1~0.3% of zirconium, 0.6~1% of carbon, 0.1~0.3% of silicon, 0.1~0.3% of manganese, 0.1~0.3% of titanium, 0.1~0.8% of vanadium, and the balance consisting of impurities such as less than 0.06% of sulfur, less than 0.07% of aluminum, less than 0.7% of iron and less than 2.6% of Hf, Y and Ta metals as a total weight, which do not significantly affect any mechanical property.

As such the chemical composition of this invention is limited for the following reasons.

Chrome is a component comprising an austenite system necessary for safeguarding anti-oxidation effect at a higher temperature, but this effect is not ensured when the chrome content is less than 25%. Chrome rapidly deteriorates the strength and toughness at a higher temperature when present in an amount of more than 35%. Thus, the chrome content should be in the range of 25~35%.

Nickel, having co-existed, is a component improving the strength at a higher temperature and comprises an austenite system. Thus, it functions to stabilize this alloy structure and at the same time, improve the workability. It is desired that the nickel content be more than 9% and preferably, up to 12%, since excess amount of the nickel contents causes the increase of production cost.

Tungsten combines with carbon to form MC-type carbide having a high melting point, while generally preventing the formation of carbides at low melting point such as M7, C3 and M23C6. Further, tungsten functions to form a high solution in an austenite system and improve the strength at a higher temperature, thus effectively strengthening this alloy structure. However, such effect is not ensured and any stability becomes difficult when the tungsten content is less than 6%. In general, tungsten rapidly deteriorates the anti-oxidation effect and toughness at a higher temperature when present in an amount of more than 12%. Preferably, the tungsten content should be in the range of 2~12%.

According to this invention, in particular, manganese and silicon are added for ensuring the decarbonation effect, while controlling the fluidity. These elements when used in an excessive amount of 0.3% or more, respectively, increase the brittleness and may generate crack during cooling process after casting.

Further, niobium is added for the stabilization of the structure at a higher temperature and this element when used in an excessive amount but causes increased casting cost and is also responsible for fatigue fracture at a higher temperature. Zirconium is added as a deoxidizer within liquid metal and this element when used in an excessive amount, however, may be present in the form of zirconia as an impurity within this alloy structure.

Carbon forms a high solution within this alloy structure; namely, it forms a carbide in combination with chrome, tungsten and niobium. Further, carbon functions to strengthen the bonding power among crystal grains (GRAN) in the structure so as to improve the strength and weldability and casting effect at a higher temperature. However, the carbon content of more than 1% deteriorates the toughness. In contrast, such effect is not ensured when the carbon content is less than 0.6%, thereby failing to effect the required strength at a higher temperature.

Further, both titanium and vanadium function ton strengthen the precipitation-hardening and the microstructure. These elements when used in an excessive amount, however, increase the brittleness.

The process of manufacturing an alloy according to the above chemical composition of this invention will be described as follows:

The conventional stellite system employs rare earth metals, an oxide or carbide, designed to improve the hardness and anti-tension by evenly distributing carbons at higher temperature but according to this invention, such substances as niobium, titanium carbide, tungsten carbide and vanadium instead of the above mentioned rare earth metals are adequately blended so as to accurately control the melting temperature and time depending on each alloy and to provide the adequate heat treatment conditions, thereby leading to manufacture of heat-resisting steel in good quality.

The melting process according to the alloy composition of this invention is performed as follows:

After accurately weighing each element such as cobalt, nickel, chrome, niobium, zirconium, vanadium and titanium in the form of plate, granule or grain including tungsten and carbon in the form of powder according to the above composition ratio, these elements are melted in an induction generator where vacuum melting is available by increasing the temperature up to 1,550~1,600° C.

The mixture is maintained at such temperature at about 20 minutes and then, a master alloy in a cylindrical form is prepared.

The master alloy is melted under vacuum and kept it constantly at the temperature of 1,680~1,750° C. for 15 minutes and the liquid metal temperature is lowered to 1,510~1,550° C. Then, the liquid oxide is reduced while gas within the liquid metal is discharged out of the melting furnace. During the vacuum melting process, the vacuum pressure within a vacuum chamber shows a plentiful amount of pressure control curve depending on each melting temperature. To increase the melting temperature, it is preferred that the gas within a vacuum chamber is substituted into inert gas and during the vacuum melting process, the vacuum pressure is maintained at about 500 mm bar and the vacuum degree is increased at pouring temperature.

Thereafter, manganese and silicon are subsequently added to the furnace under the condition that the liquid metal temperature is lowered to 1,510~1,550° C. and for deoxidation and stabilization of the liquid metal, stood at a certain time. Then, the liquid metal is poured to a cast to prepare an alloy.

The melting process of alloy elements as one embodiment of this invention is explained as follows: first, cobalt and nickel at low-temperature melting point are charged to a melting furnace and melted at about 1,500° C.; with the addition of chrome, powder, tungsten, titanium, vanadium and zirconium, the mixture temperature is rapidly increased up to 1,700° C. within a short time and kept it for 15~20 minutes for dispersed melting; then, with another addition of powder carbon, some body-centered crystal elements and carbon are combined to form an infiltration-type carbide.

Thereafter, when the liquid metal temperature is lowered to about 1,500° C., some existing metals such as carbide crystal grain, instable liquid oxide and liquid are present in the liquid metal. Hence when both manganese and silicon are added to the liquid metal for facilitating the deoxidation effect and fluidity and the mixture is poured to a cast, a defect-free cast may be made available.

When virgin elements themselves are melted for the manufacture of an alloy without manufacturing the master alloy ground metal, the increase of melting furnace temperature in an excessive vacuum state cannot convert the alloy elements at higher melting point into liquid phases and with a high solution mixed, such elements are boiling over at a melting furnace, which results in inappropriate melting. In this case, it is preferred to perform the melting process by changing the air within a vacuum chamber into inert gas prior to increasing the temperature. Hence, it is recommended to use nitrogen gas as inert gas but in case of using nitrogen gas, there is a possibility that during the hot melting process, nitrogen gas infiltrates into the liquid metal, thus generating a liquid nitride or liquid oxide via reaction with oxygen present in the remaining air. In this respect, a remedy to reduce the nitride and oxide should be establish prior to pouring the melting liquid into a mold.

Hence, the majority of nitride is reduced when the melting temperature is lowered, while some part of oxide is partially reduced and blowed off and other part of oxide is remaining in the liquid metal. The remaining oxide may be deoxidized by manganese but if much longer time elapses after pouring manganese, oxygen is again infiltrated. Thus, it is necessary to pour the alloy elements into a mold within an appropriate time.

According to this invention, the reduction temperature of an alloy in the form of liquid-phase or oxide is preferably 1,480° C. However, if the shape of alloy is large, it is preferred that the liquid metal is reduced and stabilized in the range of 1,510~1,550° C. and poured into a mold so as to obtain an appropriate alloy having no cold laps. In the light of such property, if a master alloy is not manufactured, accurate characteristics of an alloy may be obtained, when 1 mold casting is to be manufactured by melting one time, i.e., by casting one alloy from melting 1 mold of alloy weight at a melting furnace.

In general, the ongoing melting process may induce not only an excessive generation of carbide, but also an earlier generation of crystal oxide, being responsible for the brittleness. To prevent such occurrence, the order of charging the alloy elements into a melting furnace is the most important.

First of all, some elements, which have high melting temperatures and do not generate any crystal grain incurred out of the combination with oxygen at higher temperature, should be melted.

Therefore, an optimal temperature designed to generate appropriate crystal grains of heat-resisting carbide according to the alloy of this invention is about 1,680~1,720° C. and zirconia refractory material is preferable as a crucible material, being adequate to the above melting temperature.

Hence, the generating amount of carbide crystal grain is proportional to the added carbon amount and body-centered crystal elements at a higher melting point.

Then, when the liquid metal temperature is cooled to about 1,510° C., chrome in a diffused melting state begins to grow as a resin-phase crystal grain in the body-centered crystal structure by making the carbide crystal grain as nucleus. Also, niobium begins to grow as a face-centered cubic resin-phase crystal grains by making a separate carbide crystal grain as a nucleus; namely, liquid metal is in the state where cobalt- and nickel-containing liquid as main components, crystal grains of chrome, crystal grains of niobium, tungsten carbide and titanium carbide are mixed. If the temperature-maintaining time is lengthened, the large grown resin-type crystal grains will form a large size structure after pouring. Therefore, if such temperature-maintaining time is adequately controlled, the grain size corresponding to the desired use may be obtained.

Further, if a lot of nucleus generation is effected with the addition of some elements such as vanadium, a close-packed structure will be made available. This may contribute much to hardness and anti-abrasiveness but special attention for increased hot brittleness should be taken. In this case, some thermal treatment such as annealing and normalizing should be performed.

Further, if the structure is grown large with more lengthened temperature-maintaining time, the brittleness becomes good but anti-abrasiveness is poor, thus requiring the heat treatment such as normalizing and precipitation-hardening heat treatment is required.

Ceramic mold (uni-cast) and roast wax cast (investment cast) may be preferably used as the alloy cast of this invention. Whether any alloy cast is used, the rapid discharge 40 minutes after casting leads to air quenching and the structure is close-packed.

If an alloy is manufactured by ceramic mold, its mold temperature is preferably 100~400° C. and the mold is calcined at about 1,000° C. and cooled prior to use. Further, in case fine or large-grown solidification structure is locally intended to be obtained by the difference of cooling rate via rapid or slow cooling, the mold is completely cooled at room temperature and then, the mold surface is locally heated and liquid metal is poured, a large-grown structure is obtained at a higher casting temperature, while close-packed alloy structure may be obtained at lower molding temperature. The influx of any moisture should be prevented in a calcined cast when cooled in the air, since its presence may be responsible for gas-empty defect at the surface of alloy.

As for the pouring rate, runner and gate should be designed as an appropriate method to rapidly pour the melting into a mold in the range where any mold expansion by the remaining gas in a mold is not induced. One radiation-type gate is more effective than plural separation-type gates in eliminating the cast defects. If plural gates are poured, the oxidation layer of chrome occurs at the flow front of liquid metal and this oxidation layer generates a cold laps by oxide film when it is solidified in conjunction with the adjacent flow front.

Sink requires a special thermal insulation. As mentioned in the above, according to an alloy of this invention, chrome resin phase, niobium resin phase and carbide high solution are in the excessive cooling state before pouring and are poured to a cast under their highly solubilized state in some existing metals liquid such as cobalt and nickel. However, since their solidification time is extremely short and fluidity is also poor, the solidification shrinkage amount should be immediately supplemented in the sink. Therefore, the thermal insulation of the sink is necessary and it is more effective to use a thermal sleeve.

Meantime, the investment casting method is the most appropriate molding in embodying an alloy of this invention and the major consideration lies in the gate thermal insulation in gate portion. Since any sink is not employed in the common investment casting method, the shrinkage defects may easily occur around the gate. Thus, it is recommended to remove wax after manufacturing a cast using previously prepared thermal-insulation ceramic pipe and wax. The mold temperature in pouring the plastic material is preferably 900° C. and when the pouring process is performed in a vacuum chamber, the temperature is preferably in the range of 600~900° C. depending on the applicable purpose of an alloy.

In this case, the separation-type gate is more advantageous; in the process of filling the liquid metal into a mold, the thermal insulation of a cast contributes to less decrease in temperature at a flow front and no casting defect is observed in junction side adjacent to the flow front. It is preferred that when the separation-type gate is designed, the filling process is performed in consideration of flow balance and section resistance at each gate.

Meanwhile, according to the alloy heat treatment of this invention, both solution heat treatment and precipitation-hardening heat treatment are available. Preferably, the solution heat treatment is carried out at a vacuum heat treatment furnace. The temperature of some products having less than 25 mm in the thickness of cast is increased at each 200° C. per hour and after increasing the temperature up to 1,180~2,000° C., the same temperature is maintained at 2 hours for the gas quenching treatment.

The precipitation-hardening heat treatment is carried out as follows: after the solution heat treatment, the temperature is increased up to 900~920° C. and maintained for 20 hours. Then, tungsten and carbon, being distributed to in the nickel-cobalt austenite structure, are diffused into carbide structure and precipitated.

According to this invention, it is extremely difficult to precipitate titanium carbide and tungsten carbide simultaneously. Titanium when added excessively causes overageing so that special attention should be exercised in controlling the content of trace elements.

FIG. 1 is an electron microscopy photograph showing an alloy of this invention effected by the solution heat treatment, followed by the ageing treatment. From the photograph of FIG. 1, no change has been observed in the structure of both chrome resin phase and niobium resin phase after the solution heat treatment. Further, it is noted that nickel, cobalt and triangle-shaped tungsten carbide in the structure has been precipitated in a close-packed manner.

Therefore, an alloy of this invention has excellent hot strength and anti-abrasiveness at the applicable temperature of 900~1,200° C. and may be used as a spinner wheel material to prepare glassfiber for a longer period of time.

Figure 2:
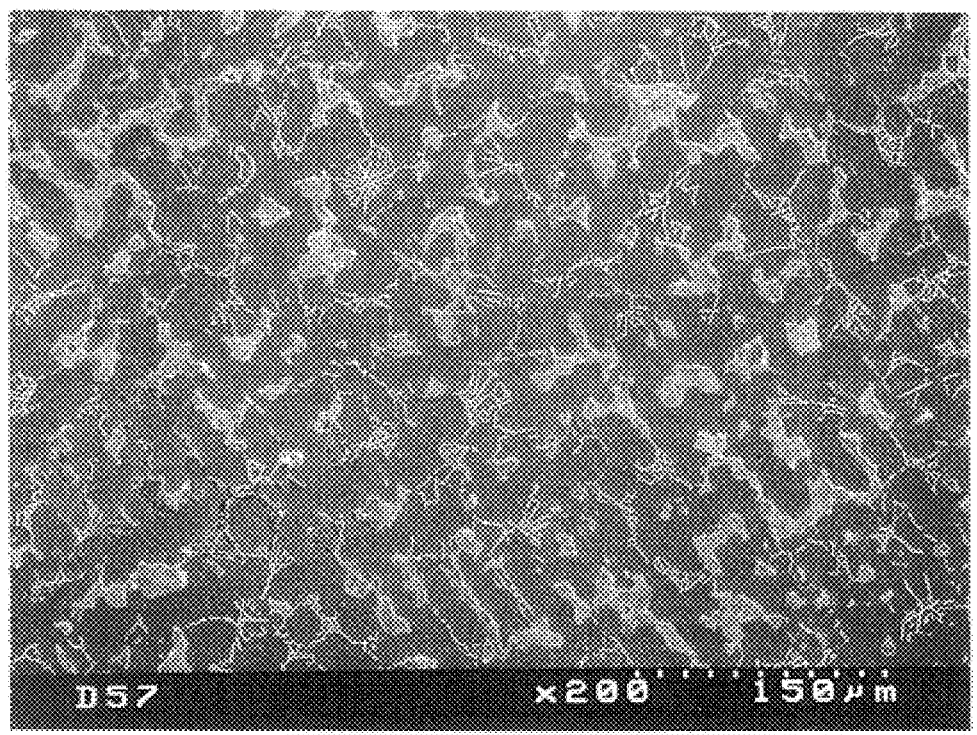
FIG. 2 is a photograph showing an alloy structure of this invention.
Figure 3:
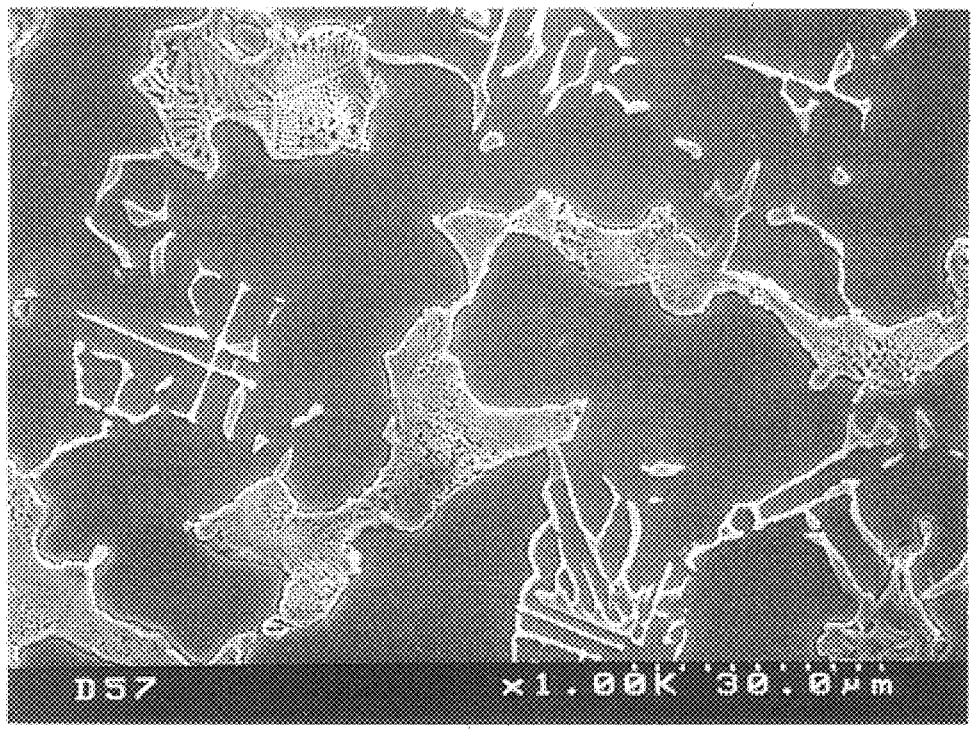
FIG. 3 is an image photograph showing a partial enlargement of the composition of an alloy structure of this invention.
Figure 4:
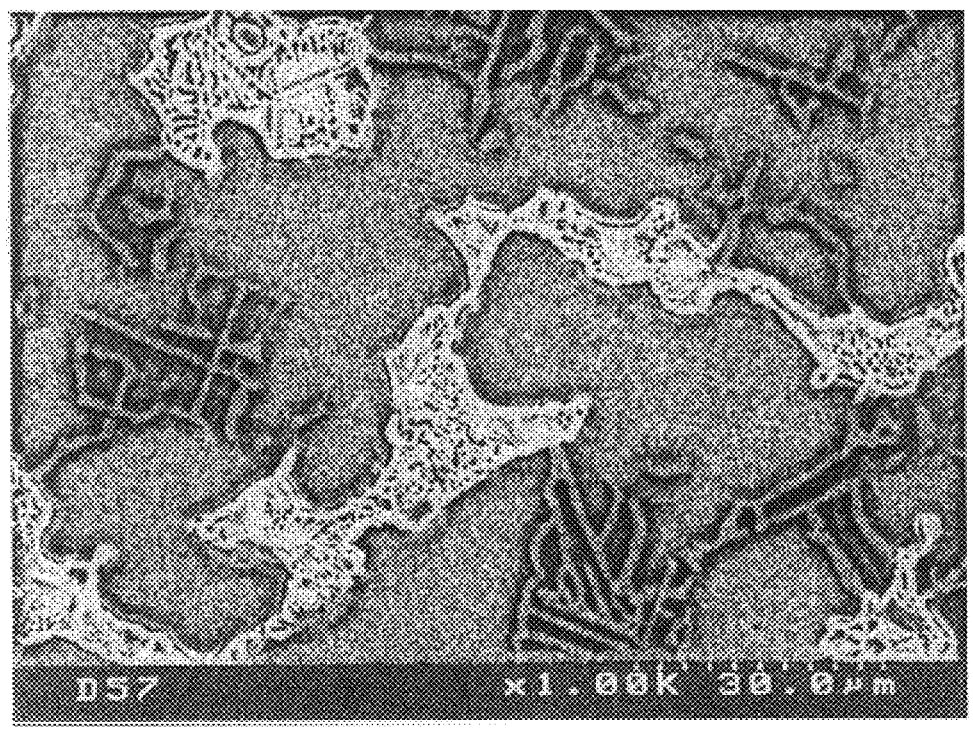
FIG. 4 is a photograph showing the distribution of chrome on the vertical structure in the alloy of this invention.
Figure 5:
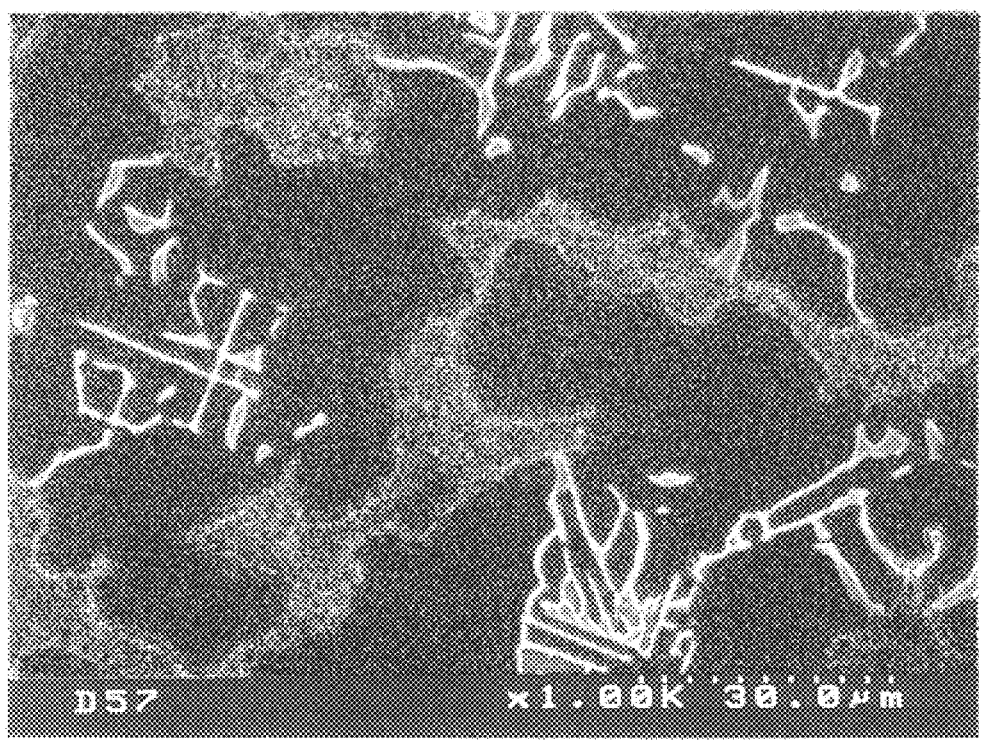
FIG. 5 is a photograph showing the distribution of niobium on the resin phase structure within the alloy of this invention.

Also, FIG. 2 is a photograph showing an alloy structure of this invention and it is the same as FIG. 3, when the composition of an alloy structure is partially enlarged and image-treated. FIG. 3 shows the composition distribution of this alloy obtained from the scanning of an electron microscopy. Further, FIG. 4 and FIG. 5 show the resin phase in the structure; FIG. 4 and FIG. 5 shows the chrome distribution and niobium distribution, respectively.

As shown in FIG. 2, chrome resin phase and niobium resin phase according to this invention are evenly dispersed. These resin phases consist of a strong network-shape web in three-dimensional space and such crystal phase is strongly supported by austenite structure of Co and Ni at low melting point having tungsten carbide and Zr as a nucleus. Thus, an alloy of this invention has a strong anti-abrasiveness and strength at a higher temperature. In particular, since the solidification of grain boundary is completed by the face centered crystal bonding between cobalt and nickel.

This invention is explained in more detail by referring to the following examples but this invention is not limited by these examples.

EXAMPLE 1~6

1. Manufacturing Process Where the Composition Scope of this Invention was Applied (Master Alloy Applied)

1) Co 48%, Ni 11%, Cr 28%, W 9%, Nb 2.7%, Zr 0.1%, C 0.6%, Mn 0.2%, Si 0.2%, V 0.05%, Ti 0.15%.
   2) Co 45%, Ni 11%, Cr 31%, W 9%, Nb 2.5%, Zr 0.2%, C 0.6%, Mn 0.3%, Si 0.2%, V 0.1%, Ti 0.1%.
   3) Co 45%, Ni 10%, Cr 31.9%, W 9%, Nb 2.6%, Zr 0.2%, C 0.6%, Mn 0.2%, Si 0.2%, V 0.1 %, Ti 0.2%.

2. Manufacturing Process Where the Composition Scope of this Invention was Applied (Master Alloy Unapplied)

4) Co 45.2%, Ni 10.8%, Cr 30.8%, W 9%, Nb 2.7%, Zr 0.2%, C 0.7%, Mn 0.2%, Si 0.1%, V 0.1%, Ti 0.3%.
   5) Co 45%, Ni 10.8%, Cr 31%, W 9%, Nb 2.8%, Zr 0.2%, C 0.6%, Mn 0.2%, Si 0.15%, V 0.05%, Ti 0.2%.
   6) Co 45%, Ni 10.8%, Cr 31.55%, W 8.2%, Nb 3.0%, Zr 0.2%, C 0.6%, Mn 0.2%, Si 0.2%, V 0.1%, Ti 0.15%.

COMPARATIVE EXAMPLE 1~8

1. Manufacturing Process Where the Composition Scope of this Invention was Exceeded (Master Alloy Applied)

1) Co 47.9%, Ni 10.95%, Cr 31.2%, W 5.2%, Zr 0.25%, Ta 2.85%, Hf 0.9%, Si 0.15% and C 0.6%.
   2) Co 33.9%, Ni 22.1%, Cr 32.85%, W 6.2%, Zr 0.2%, Ta 3.65%, Mn 0.3%, C 0.6% and Si 0.2%.

2. Manufacturing Process Where the Composition Scope of this Invention was Exceeded (Master Alloy Unapplied)

3) Co 46.5%, Ni 12%, Cr 31.75%, W 5.1%, Ta 3.0%, Zr 0.25%, Hf 0.7% and C 0.7%.
   4) Co 0.27%, Ni 52.3%, Cr 26.32%, W 4.83%, C 0.51%, Fe 14.52%, Mn 1.15% and V 0.1%.

3. Existing Air-Melt Casting Method

5) Co 48.02%, Ni 11.46%, Cr 27.19%, W 8.97%, Nb 2.21%, C 0.9%, Fe 0.3%, Mn 0.4%, Si 0.2% and Ta 0.35%.
   6) Co 45.64%, Ni 11.53%, Cr 30.36%, W 8.55%, Nb 1.94%, C 0.93%, Mn 0.16%, Fe 0.4%, Si 0.2%, Ta 0.12% and Cu 0.17%.

4. Existing Vacuum-Melt Casting Method

7) Co 47.97%, Ni 10.95%, Cr 31.24%, W 5.19%, Ta 2.97%, Zr 0.28%, Hf 0.7% and C 0.7%.
   8) Co 33.9%, Ni 22.15%, Cr 33.94%, W 6.2%, Ta 2.27%, Zr 0.31%, C 0.7%, Mn 0.01%, Fe 0.51% and S 0.01%.

EXPERIMENTAL EXAMPLE 1

The following table 3 shows a test result on the spinner wheel manufactured based on an alloy of this invention and in order to determine the elongation amount, the wheel was rotated under the following conditions and the creep test was replace: weight of spinner wheel: 10 kg, applicable temperature: 1,150~1,200° C., rotation number of spinner wheel: 2,250 rpm, external diameter of spinner wheel: 380 mm, hoop tensile load: 1,86 kg/mm, continuous circumferential speed for continuous 200 hours: 47.1 m/sec, production amount per hour: 700 kg and area diameter of glass: 6~7.5 micron.

EXPERIMENTAL EXAMPLE 2

By the same procedure as described in the Experimental Example 1, the alloy samples prepared from the Example 1~6 and Comparative Example 1~8 were used so as to determine their performance and the results were shown in the following table 3.

TABLE 3

Comparative performance list on each sample (applicable to spinner wheel to manufacture glassfiber)

| Sample No. | Time applied(hr) | Strain amount(%) |
|---|---|---|
| Example 1 | 207 | 0.52 |
| Example 2 | 202 | 0.46 |
| Example 3 | 018 | 0.51 |
| Example 4 | 198 | 0.36 |
| Example 5 | 227 | 0.17 |
| Example 6 | 215 | 0.39 |
| Comparative Example 1 | 168 | 1.92 |
| Comparative Example 2 | 172 | 1.25 |
| Comparative Example 3 | 154 | 2.64 |
| Comparative Example 4 | 58 | 5.25 |
| Comparative Example 5 | 152 | 1.97 |
| Comparative Example 6 | 165 | 1.85 |
| Comparative Example 7 | 188 | 3.68 |
| Comparative Example 8 | 192 | 3.55 |

From the above table, it was noted that the mean elongation amount (0.40%) in the Examples is superior to that (2.76%) in the Comparative Examples and the mean applied time (211 hours) in the Examples is better than that (156 hours) in the Comparative Examples.

This invention relates to a cobalt-based heat-resisting composition used as a spinner wheel material to prepare glassfiber, which enable to manufacture a cobalt-based heat-resisting alloy having excellent strength, anti-abrasiveness and antioxidative effects at a higher temperature. To establish the chemical composition of an alloy suitable for vacuum melting and casting, Mn and Si are added to the basic alloy composition consisting of Co, Cr, Ni and W, thus controlling a deoxidating effect and fluidity; Nb, Ti, V, Zr, C and Si are used as other additive elements instead of using the conventional high-priced rare earth metals (such as Y), as well as Ta, Hf and with the allowed scope of impurities enlarged, thereby preventing any casting defects from the generation of bubbles; since cementite crystal phase of both Nb and Cr is evenly distributed within an alloy and more strong web of the three-dimensional network structure, such crystal phase is strongly supported by austenite structure of Co and Ni having tungsten carbide and Zr as a nucleus.

What is claimed is:

1. A cobalt-based heat-resisting alloy containing Co, Cr, Ni, W, C, Nb, Si and Zr and impurities, wherein the alloy comprises the following chemical composition by wt % in Table 1 without containing any rare earth metal except unavoidable impurities, selectively contained in Table 2

TABLE 1

| Element | Scope | Element | Scope | Element | Scope |
|---|---|---|---|---|---|
| Cr | 25~33% | Nb | 2.5~4.8% | Si | 0.1~0.3% |
| Ni | 9~12% | Zr | 0.1~0.3% | Mn | 0.1~[03%]0.3% |
| W | 6~12% | C | 0.6~1.0% | Ti | 0.1~0.3% |
| V | 0.05~0.8% | Co | Balance | | |

TABLE 2

| Impurity | Scope | Impurity | Scope |
|---|---|---|---|
| S | 0.06% or less | Hf* | *The indicative composition |
| Al | 0.07% or less | Ta* | contains less than 2.6% of a |
| Fe | 0.7% or less | Y* | combined total weight of Hf, Ta |
| P | 0.01% or less | | and Y |

2. A process of manufacturing a cobalt-based heat-resisting alloy comprising the following steps:

charging Co, Cr, Ni, W, C, Nb, Si, Zr, Ti and V to a vacuum reactor and melting them at 1,550~1,600° C. to prepare a master alloy;

vacuum-melting said master alloy at 1,680~1,750° C.; and charging Mn and Si in a sequential order at said molding temperature reduced to 1,510~1,5550° C. and injecting the mixture into a cast and molding thereof, wherein the cobalt-based heat-resisting alloy contains no rare earth metals.

* * * * *